United States Patent
Smith et al.

(10) Patent No.: US 8,259,662 B2
(45) Date of Patent: Sep. 4, 2012

(54) METHOD AND APPARATUS FOR ASSIGNING PERSISTENT RESOURCES DYNAMICALLY IN A WIRELESS COMMUNICATION SYSTEM

(75) Inventors: Jack Smith, Valley View, TX (US); Sean Michael McBeath, Keller, TX (US)

(73) Assignee: FutureWei Technologies, Plano, TX (US)

( * ) Notice: Subject to any disclaimer, the term of this patent is extended or adjusted under 35 U.S.C. 154(b) by 661 days.

(21) Appl. No.: 12/389,270

(22) Filed: Feb. 19, 2009

(65) Prior Publication Data

US 2009/0207785 A1 Aug. 20, 2009

Related U.S. Application Data

(60) Provisional application No. 61/029,755, filed on Feb. 19, 2008.

(51) Int. Cl.
*H04W 4/00* (2009.01)
(52) U.S. Cl. ........ 370/329; 370/341; 370/348; 370/443; 455/450; 455/509; 709/226
(58) Field of Classification Search .................. None
See application file for complete search history.

(56) References Cited

U.S. PATENT DOCUMENTS

| | | | |
|---|---|---|---|
| 6,377,572 B1 | 4/2002 | Dolan et al. | |
| 6,404,325 B1 | 6/2002 | Heinrich et al. | |
| 6,597,919 B1 | 7/2003 | Kumar et al. | |
| 6,907,246 B2 | 6/2005 | Xu et al. | |
| 7,116,240 B2 | 10/2006 | Hyde | |
| 7,215,251 B2 | 5/2007 | Hyde | |
| 7,706,323 B2 | 4/2010 | Stopler et al. | |
| 2002/0150058 A1* | 10/2002 | Kim et al. | 370/280 |
| 2003/0221012 A1 | 11/2003 | Herrmann et al. | |
| 2004/0145454 A1 | 7/2004 | Powell et al. | |
| 2005/0201269 A1* | 9/2005 | Shim et al. | 370/329 |
| 2005/0281228 A1 | 12/2005 | Oh et al. | |

(Continued)

FOREIGN PATENT DOCUMENTS

CN 1536794 A 10/2004

(Continued)

OTHER PUBLICATIONS

Bourlas, Y., et al., "Persistent Allocation Updated Procedures," IEEE 802.16 Broadband Wireless Access Working Group, IEEE P802.16Rev2/D4, Apr. 19, 2008, pp. 1-50, IEEE.

(Continued)

*Primary Examiner* — Jeffrey M Rutkowski
(74) *Attorney, Agent, or Firm* — Slater & Matsil, L.L.P.

(57) ABSTRACT

A method and apparatus for dynamically assigning persistent resources in a wireless communications system is provided. A method comprises transmitting a first boundary indication to a mobile station, and transmitting a position indication to the mobile station, wherein the position indication corresponds to a network resource assigned based on a network resource request, the position indication is relative to the first boundary indication. The method also comprises transmitting a second boundary indication to the mobile station in response to detecting a change in a position of a boundary, and transmitting a first transmission to the mobile station using a network resource corresponding to the position indication or receiving a second transmission from the mobile station using a network resource corresponding to the position indication, wherein the position indication is relative to the second boundary indication. The first boundary indication is based on a position of the boundary.

23 Claims, 9 Drawing Sheets

U.S. PATENT DOCUMENTS

| | | |
|---|---|---|
| 2006/0039274 A1 | 2/2006 | Park et al. |
| 2006/0133312 A1 | 6/2006 | Harrison Teague et al. |
| 2006/0153227 A1* | 7/2006 | Hwang et al. ............... 370/328 |
| 2006/0209754 A1 | 9/2006 | Ji et al. |
| 2006/0293076 A1 | 12/2006 | Julian et al. |
| 2007/0058523 A1* | 3/2007 | Cho et al. ................... 370/328 |
| 2007/0060178 A1 | 3/2007 | Gorokhov et al. |
| 2007/0076670 A1 | 4/2007 | Kuchibhotla et al. |
| 2007/0097910 A1 | 5/2007 | Ji et al. |
| 2007/0206561 A1 | 9/2007 | Son et al. |
| 2007/0217370 A1 | 9/2007 | Soong et al. |
| 2007/0230412 A1 | 10/2007 | McBeath et al. |
| 2007/0274288 A1 | 11/2007 | Smith et al. |
| 2007/0275728 A1* | 11/2007 | Lohr et al. .................. 455/450 |
| 2007/0286066 A1 | 12/2007 | Zhang et al. |
| 2007/0291708 A1 | 12/2007 | Rao |
| 2008/0004029 A1 | 1/2008 | Moilanen |
| 2008/0025247 A1 | 1/2008 | McBeath et al. |
| 2008/0025337 A1 | 1/2008 | Smith et al. |
| 2008/0034274 A1 | 2/2008 | Song et al. |
| 2008/0037496 A1 | 2/2008 | Smith et al. |
| 2008/0039107 A1* | 2/2008 | Ma et al. .................... 455/450 |
| 2008/0043615 A1 | 2/2008 | Li et al. |
| 2008/0043709 A1* | 2/2008 | Zhou et al. .................. 370/348 |
| 2008/0062936 A1 | 3/2008 | He et al. |
| 2008/0062944 A1 | 3/2008 | Smith et al. |
| 2008/0080422 A1* | 4/2008 | Frederiksen et al. ......... 370/329 |
| 2008/0080423 A1* | 4/2008 | Kolding et al. .............. 370/329 |
| 2008/0084843 A1* | 4/2008 | Gorokhov et al. ............ 370/330 |
| 2008/0146241 A1* | 6/2008 | Das et al. .................... 455/450 |
| 2008/0192847 A1 | 8/2008 | Classon et al. |
| 2008/0240034 A1 | 10/2008 | Gollamudi |
| 2009/0022098 A1 | 1/2009 | Novak et al. |
| 2009/0047912 A1 | 2/2009 | Lee et al. |
| 2009/0075667 A1* | 3/2009 | Bourlas ..................... 455/452.1 |
| 2010/0265911 A1* | 10/2010 | Wu et al. ..................... 370/330 |

FOREIGN PATENT DOCUMENTS

| | | |
|---|---|---|
| CN | 1780188 A | 5/2006 |
| CN | 1968452 A | 5/2007 |
| CN | 101102142 A | 1/2008 |
| EP | 1 786 220 A1 | 5/2007 |
| WO | WO 2006/001658 A1 | 1/2006 |
| WO | WO 2006/096887 A1 | 9/2006 |
| WO | WO 2006/099577 A1 | 9/2006 |
| WO | WO 2006/113873 A2 | 10/2006 |
| WO | WO 2005/137708 A1 | 12/2006 |

OTHER PUBLICATIONS

McBeath, S., et al., "Efficient Bitmap Signaling fo VoIP in OFDMA," 2007 Vehicular Technology Conference, Sep. 30, 2007-Oct. 3, 2007, 5 pages, IEEE.

McBeath, S., et al., "Efficient Signaling for VoIP in OFDMA," 2007 Wireless Communications and Networking Conference, Mar. 11-15, 2007, 6 pages, IEEE.

"Medium Access Control Layer for Ultra Mobile Broadband (UMB) Air Interface Specification," 3$^{rd}$ Generation Partnership Project 2, 3GPP2 C.S0084-0020-0, Version 2.0, Aug. 2007, 157 pages, 3GPP2.

Written Opinion of the International Searching Authority, App. No. PCT/CN2008/071325, Date of mailing: Sep. 18, 2008, 5 pages.

Written Opinion of the International Searching Authority, App. No. PCT/CN2008/071317, Date of mailing: Sep. 18, 2008, 4 pages.

First Chinese Office Action, Chinese Application No. 200880001172.3, Dated: Jul. 1, 2010, 6 pages.

Second Chinese Office Action, Chinese Application No. 200880001172.3, Dated: Feb. 28, 2011, 9 pages.

Third Chinese Office Action, Chinese Applicantion No. 200880001172.3, Jun. 15, 2011. 9 pages.

"Text Proposal for Downlink OFDMA Resource Allocation and Mapping Rules for Distributed Mode Users in E-UTRA, with Discussion on Control Information," 3GPP TSG RAN WG1 #45, R1-061149, May 8-12, 2006, pp. 1-8.

Classon, B.K., et al., U.S. Appl. No. 60/888,833, filed Feb. 8, 2007, the specification and drawings, 40 pages.

"Technical Specification Group Radio Access Network; Physical Layer Aspects for Evolved UTRA (Release 7)," 3$^{rd}$ Generation Project, 3GPP TR 25.814, V1.3.1, May 2006, pp. 6-11.

First Chinese Office Aciton with Partial Translation received in Chinese Application No. 200880001601.7, mailed Apr. 25, 2012.

"Part 16: Air Interface for Fixed Broadband Wireless Access Systems," Air Interface for Fixed Broadband Wireless Access Systems, IEEE P802,16-REVd.D5, May 2004, pp. 7-12.

* cited by examiner

| PARAMETER NAME | NUMBER OF BITS |
|---|---|
| BASE STATION ID | 48 |
| CONFIGURATION COUNT | 8 |
| NUMBER OF OFDMA SYMBOLS | 8 |
| ASSIGNMENT MESSAGES | VARIABLE |

METHOD AND APPARATUS FOR ASSIGNING PERSISTENT RESOURCES DYNAMICALLY IN A WIRELESS COMMUNICATION SYSTEM

This application claims the benefit of U.S. Provisional Application No. 61/029,755, filed on Feb. 19, 2008, entitled "Method and Apparatus for Assigning Persistent Resources Dynamically in a Wireless Communication System," which application is hereby incorporated herein by reference.

TECHNICAL FIELD

The present invention relates generally to wireless communications, and more particularly to a method and apparatus for dynamically assigning persistent resources in a wireless communications system.

BACKGROUND

In an orthogonal frequency division multiple access (OFDMA) communications system, time-frequency resources of the system may be shared among a plurality of mobile stations (MS). A base station (BS) may assign time-frequency resource to MS using an assignment message, which may be transmitted as part of a control channel. To minimize control channel overhead, the BS may make persistent assignments, wherein the assignment message is transmitted to the MS to initially indicate the assigned time-frequency resource, and then the BS uses the assigned time-frequency resource for subsequent transmissions to or receptions from the MS.

These transmissions may be hybrid automatic repeat request (H-ARQ) transmissions of the same transmission, for subsequent transmissions of different transmissions, or for initial transmissions of different transmissions, or for initial transmissions of a series of transmissions. For example, in a voice over internet protocol (VoIP) system, the BS may make a persistent resource assignment to a MS consisting of a time-frequency resource with a period equal to 20 msec (a vocoder period). Then, the BS may use this resource for the first H-ARQ transmission of each VoIP transmission. Subsequent transmissions, if necessary, must be signaled.

The initially assigned time-frequency resource may be maintained by the BS for the MS until a timer elapses, a VoIP talk-spurt completes, a VoIP call completes, the BS determines a certain number of negative acknowledgements, the BS explicitly or implicitly de-assigns the assigned time-frequency resource, or so forth.

In a wireless communications system with fixed boundaries, the assigned time-frequency resource may be specified static number, such as a number representing the beginning of the assigned time-frequency resource. However, in some wireless communications systems, there are dynamic boundaries. For example, in a time division duplex (TDD) wireless communications system, a boundary between a downlink and an uplink may be dynamic. Similarly, in a half duplex frequency division duplex (H-FDD) wireless communications system, a boundary between two groups may be dynamic. In wireless communications system with dynamic boundaries, a persistent assignment made using a static number may become incorrect once a boundary changes. In such wireless communications systems, there is not currently a mechanism to support continuing a persistent assignment when a boundary change occurs. Thus, there is a need for assigning persistent resources in a dynamic manner to allow for changing boundaries.

SUMMARY OF THE INVENTION

These and other problems are generally solved or circumvented, and technical advantages are generally achieved, by embodiments of a method and apparatus for dynamically assigning persistent resources in a wireless communications system.

In accordance with an embodiment, a method for base station operation in a wireless communications system is provided. The wireless communications system having a mobile station. The method includes transmitting a first boundary indication to the mobile station, transmitting a position indication to the mobile station, and transmitting a second boundary indication to the mobile station in response to detecting a change in the position of the boundary. The first boundary indication is based on a position of a boundary, the position indication corresponds to an assigned network resource assigned based on a network resource request, the position indication is relative with respect to the first boundary indication, and the second boundary indication is based on a changed position of the boundary. The method also includes transmitting a first transmission to the mobile station using a network resource corresponding to the position indication or receiving a second transmission from the mobile station using a network resource corresponding to the position indication. The position indication is relative to the second boundary indication.

In accordance with another embodiment, a method for mobile station operating in a wireless communications system is provided. The wireless communications system having a base station. The method includes receiving a first boundary indication from the base station, receiving a position indication from the base station, receiving a second boundary indication from the base station. The base station transmitted the second boundary indication in response to detecting a change in the position of the boundary. The first boundary indication is based on a position of a boundary, the position indication corresponds to an assigned network resource assigned based on a network resource request, and the position indication is relative with respect to the first boundary indication. The method also includes transmitting a first transmission to the base station using a network resource corresponding to the position indication or receiving a second transmission from the base station using a network resource corresponding to the position indication. The position indication is relative to the second boundary indication.

In accordance with another embodiment, a method for making persistent resource assignments is provided. The method includes finding a network resource satisfying a network resource assignment request, reserving the network resource, and computing a position indication for the network resource relative to a boundary indication. The boundary indication is based on a position of a boundary, and the boundary indication changes corresponding to any changes in the position of the boundary. The method also includes providing the position indication to a base station, and completing a network resource assignment.

In accordance with another embodiment, an electronic device is provided. The electronic device includes a base station and a scheduler coupled to the base station. The base station coordinates communications of a mobile station associated with the base station, selects a boundary for use as a reference for indicating persistent network resource allocations, transmits a first boundary indication based on a position of the boundary to the mobile station, and transmits a second boundary indication to the mobile station when the position of the boundary changes. The second boundary indication supersedes the first boundary indication. The scheduler determines allocatable network resources based on a resource request, and computes a relative offset for allocated network resources based on the boundary.

An advantage of an embodiment is that persistent assignments are made using a dynamic value, which may allow for the persistent assignment to persist after a boundary change occurs.

The foregoing has outlined rather broadly the features and technical advantages of the present invention in order that the detailed description of the embodiments that follow may be better understood. Additional features and advantages of the embodiments will be described hereinafter which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the embodiments, and the advantages thereof, reference is now made to the following descriptions taken in conjunction with the accompanying drawings, in which.

DETAILED DESCRIPTION OF ILLUSTRATIVE EMBODIMENTS

The making and using of the embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The embodiments will be described in a specific context, namely a half duplex frequency division duplex wireless communications system. The invention may also be applied, however, to other wireless communications systems, including orthogonal frequency division multiplexing (OFDM) or an orthogonal frequency division multiple access (OFDMA) communications system, such as those Evolved Universal Terrestrial Radio Access (E-UTRA) networks, Ultra Mobile Broadband (UMB) networks, IEEE 802.16 networks, and other OFDMA based networks. The invention may further be applied, to other forms of communications networks such as time division multiple access (TDMA), and frequency division multiple access (FDMA) communications systems. Examples of Global System for Mobile (GSM) and Integrated Digital Enhanced Network (iDEN) are examples of TDMA communications systems. Examples of FDMA communications systems include Advanced Mobile Phone Service (AMPS) communications systems.

Figure 1:
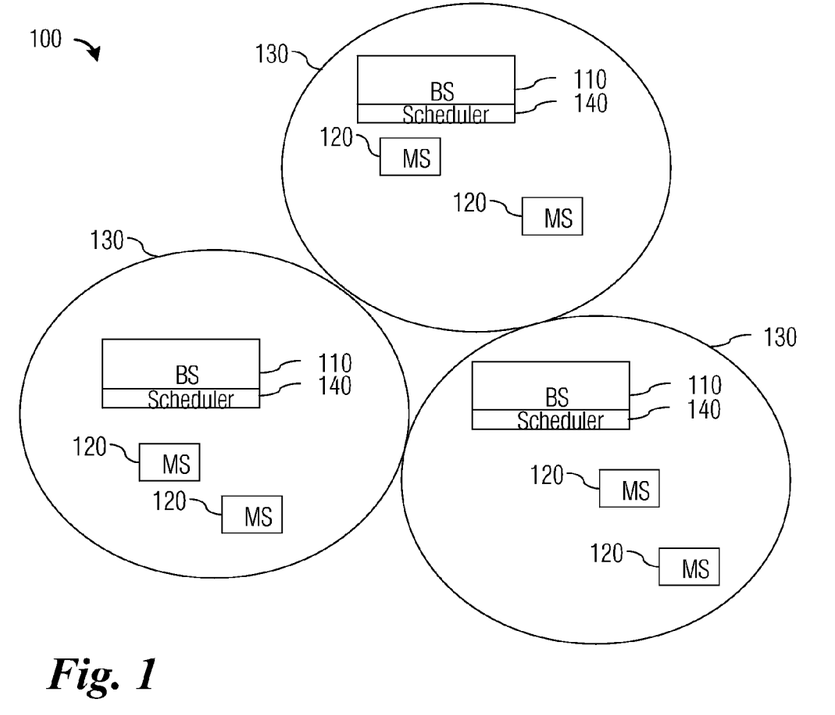
FIG. 1 is a diagram of a wireless communications system.

FIG. 1 shows a wireless communications network 100. The wireless communications network 100 includes a plurality of BS 110 providing voice and/or data wireless communications service to a plurality of MS 120. A BS may also be referred to as an access point (AP), an access network (AN), a Node-B, and so forth. Each BS 110 may have a corresponding coverage area 130. As shown in FIG. 1, each BS 110 includes a scheduler 140 for assigning radio resources to corresponding MS 120.

Exemplary wireless communications systems include Evolved Universal Terrestrial Radio Access (E-UTRA) networks, Ultra Mobile Broadband (UMB) networks, IEEE 802.16 compliant networks, and other OFDMA based networks. For example, the wireless communications network 100 may be a frequency division multiple access (FDMA) network wherein the time-frequency resources are divided into frequency intervals over a certain time interval, a time division multiplex access (TDMA) network wherein the time-frequency resources are divided into time intervals over a certain frequency interval, and a code division multiplex access (CDMA) network wherein the resources are divided into orthogonal or pseudo-orthogonal codes over a certain time-frequency interval.

Figure 2:
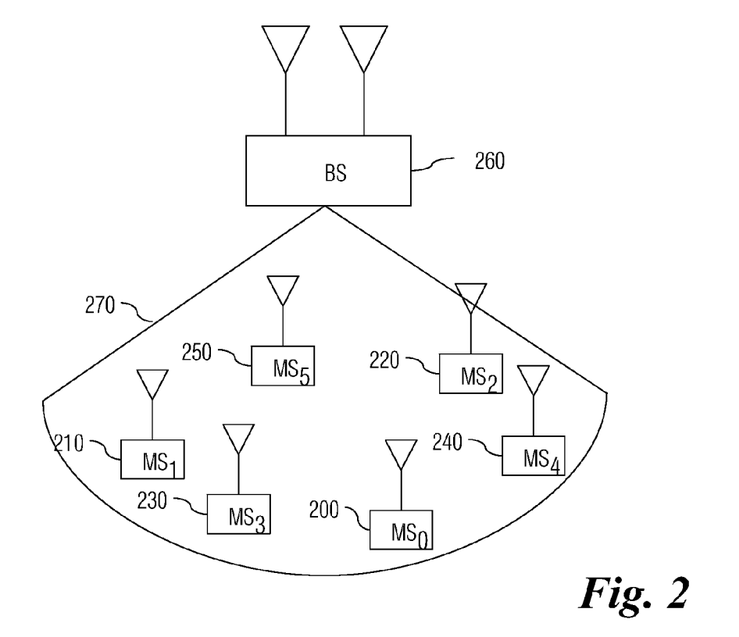
FIG. 2 is a diagram of a base station and several mobile stations.

FIG. 2 illustrates a detailed view of a BS 260 operating in a wireless communications network. In general, the BS 260 may have three coverage areas with coverage area 270 shown in FIG. 2. Six MS 200, 210, 220, 230, 240, and 250 may be operating in the coverage area 270. The BS 260 may assign to each MS (200, 210, 220, 230, 240, and 250) one or more connection identifiers (CID) or some other similar identifier to facilitate time-frequency resource assignment. The CID assignment may be transmitted from the BS 260 to the MS over a control channel. Alternatively, the CID assignment may be permanently stored at the MS or derived based on parameter of the MS or BS 260.

Figure 3:
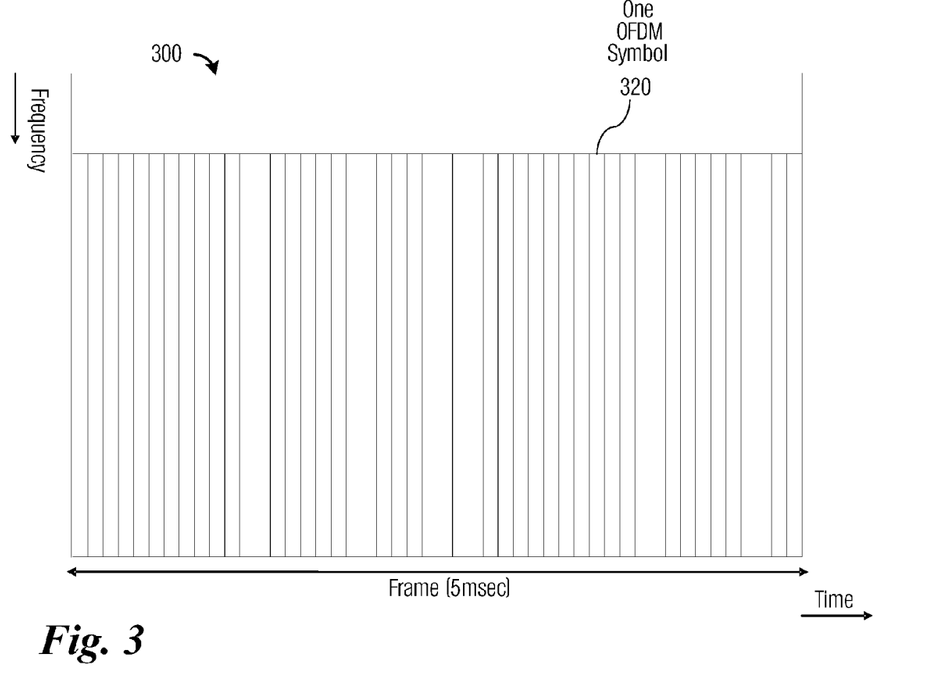
FIG. 3 is a diagram of a set of OFDMA time-frequency resources.

FIG. 3 illustrates a view of a set of OFDMA time-frequency radio resources of an OFDMA frame 300. Generally, in OFDMA communications systems, the time-frequency radio resources are divided into OFDM symbols and OFDM subcarriers for allocation by a scheduler of a BS, such as scheduler 140, and the MS. In an exemplary OFDMA communications system, the OFDM subcarriers may be approximately 10 kHz apart with a duration of each OFDM symbol being approximately 100 µsec.

FIG. 3 illustrates a single five (5) msec frame of an OFDMA communications system, such as that defined by the IEEE 802.16e standard. According to the IEEE 802.16e standard, five msec is one possible frame duration and that other frame durations are possible. As shown in FIG. 3, resources in the time domain (shown in the x-axis) may be divided into 48 OFDM symbols, such as OFDM symbol 320, while in the frequency domain (y-axis), the resources may be divided into multiple subchannels (not shown), wherein the size of a subchannel may depend on a subcarrier permutation scheme being used. A permutation scheme is a mapping from logical subchannels to physical subcarriers.

For example, downlink (DL) partial usage of subcarriers (PUSC), DL full usage of subcarriers (FUSC), and uplink (UL) PUSC are exemplary subcarrier permutation schemes defined in the IEEE 802.16 standard. Other permutation schemes are also defined in the IEEE 802.16 standard, so DL PUSC, DL FUSC, and UL PUSC are merely used to illustrate the invention and should not be construed as being limiting to either the scope or the spirit of the embodiments. For DL PUSC, with a five (5) MHz bandwidth, there are 360 data subcarriers divided into 15 subchannels, with 24 data subcarriers for each subchannel. For DL PUSC, the BS may be required to assign an even number of OFDM symbols for each subchannel. For DL FUSC, with a five MHz bandwidth, there are 384 data subcarriers divided into eight (8) subchannels, with 48 data subcarriers for each subchannel. For UL PUSC, for a five MHz bandwidth, there are 408 subcarriers (including both data and pilot subcarriers) divided into 17 subchannels, wherein each subchannel has 24 subcarriers (16 data plus eight pilot subcarriers). For UL PUSC, the number of OFDM symbols for each subchannel must be a multiple of 3.

Subchannels may be a logical representation of the time-frequency resources of the OFDMA communications system. Each logical time-frequency resource (subchannel) maps to a physical time-frequency resource. The mapping of logical time-frequency resources to physical time-frequency resources depends on which subcarrier permutation is being used. The mapping of logical time-frequency resource to physical time-frequency resources may change with time and may depend on a number of parameters defined by the OFDMA communications system.

Figure 4:
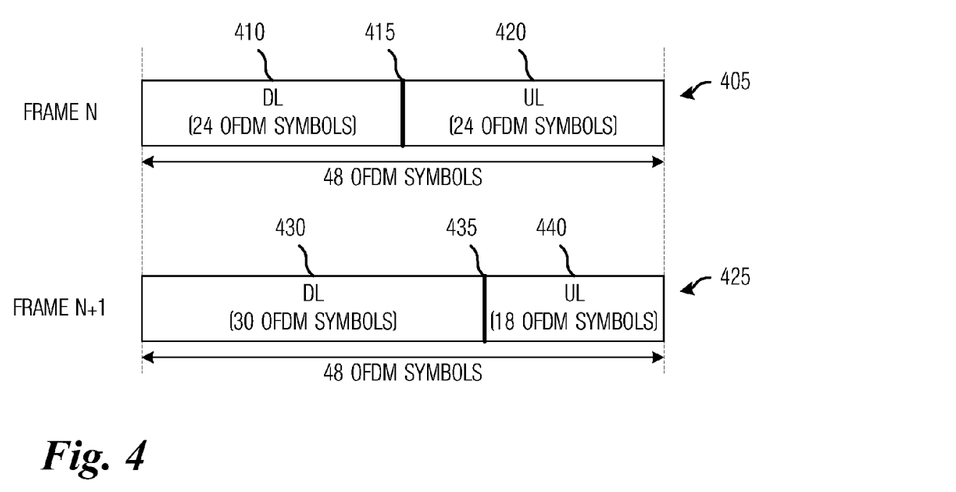
FIG. 4 is a diagram of a changing boundary in a time division duplex wireless communications system.

FIG. 4 is a diagram illustrating two time domain frames (frame N 405 and frame N+1 425) of a time domain duplex (TDD) wireless communications system. As shown in FIG. 4, the two time domain frames are divided into downlink (DL) and uplink (UL) regions. As discussed previously, each of the two time domain frames comprises 48 OFDM symbols and is 5 msec in duration. In a TDD wireless communications system, resources provided by a time domain frame must be shared by both the DL and the UL. For example, frame N 405 may be divided evenly into a DL region 410 and an UL region 420 with a guard band positioned in between, with DL region 410 and UL region 420 comprising 24 OFDM symbols each. A guard band is shown in FIG. 4 as a boundary 415.

Boundary 415 (the guard band between DL region 410 and UL region 420) may be indicated using a control message. The indication of boundary 415 may be a first OFDM symbol of UL region 420, an indication of DL to UL ratio, and so forth. After setting boundary 415, the BS may change the start of UL region 420. For example, as shown in FIG. 4, in frame N+1 425, a DL region 430 comprises 30 OFDM symbols and a UL region 440 comprises 18 OFDM symbols. Since the duration of DL region 430 and UL region 440 for frame N+1 425 are different from the duration of DL region 410 and UL region 420, a boundary 435 may be located at a different part of frame N+1 425 than boundary 415 of frame N 405.

Since the boundary between DL region and UL region changes, a static reference to a time-frequency resource that may be a valid reference with the boundary in a first position of a TDD frame may become an invalid reference with the boundary in a second position of a subsequent TDD frame. For example, a dynamic reference to time-frequency resource number five (5) of an UL region of a TDD frame with the boundary in the middle of the TDD frame (at time-frequency resource number 24) may actually refer to actual time-frequency resource number 29 of the TDD frame. However, if the boundary moves to time-frequency resource number 30, then the dynamic reference to time-frequency resource number five (5) of the UL region may actually refer to actual time-frequency resource number 35 of the TDD frame.

Figure 5A:
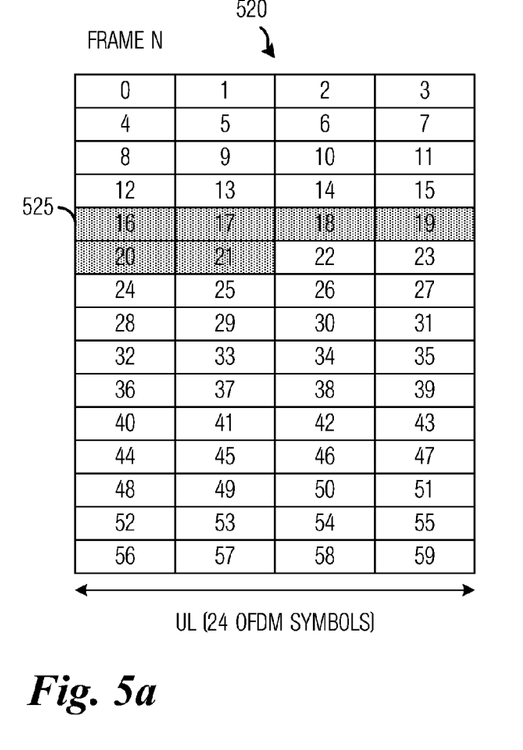
FIGS. 5a and 5b are diagrams of a persistent resource allocation before and after a changing boundary.

FIG. 5a is a diagram of a persistent resource allocation in a UL region of a TDD frame N 520. In frame N 520, the UL region comprises 24 OFDM symbols. When the BS allocates a persistent resource to a MS, the persistent resource may be signaled initially to the MS and the MS may maintain the persistent resource until time elapses, a de-assignment message is received, and so forth. In frame N 520, the BS assigns six (6) time-frequency resource units to a MS beginning with time-frequency resource unit 525 (numbered 16). Time-frequency resource unit 525 may be an exemplary position indication. Using existing persistent assignments, the MS may maintain the exact same time-frequency resources for subsequent transmissions of the persistent assignment.

However, if the BS changes a boundary between the DL region and the UL region (or some other boundary used to number time-frequency resource units), the MS needs to be able to maintain the persistent assignment. According to a preferred embodiment, when the BS changes the boundary between the DL region and the UL region (or some other boundary used to number time-frequency resource units), the BS transmits to the MS a new boundary indication. The MS may then use the new boundary indication to maintain its persistent assignment.

Figure 5B:
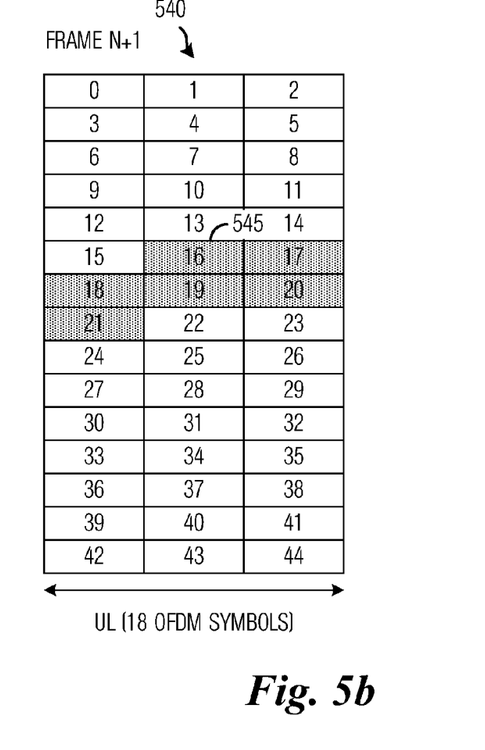

FIG. 5b is a diagram of a persistent resource allocation in a UL region of a TDD frame N+1 540. In frame N+1 540, the UL region comprises 18 OFDM symbols. In frame N+1 540, the MS continues to monitor six (6) time-frequency resource units beginning with time-frequency resource unit 545 (numbered 16). Comparing the diagrams shown in FIGS. 5a and 5b, the MS may actually be processing different time-frequency resource units in frames N 520 and N+1 540, even though the persistent assignment did not change.

In some embodiments, changing a boundary may require that the persistent assignment to expire. For example, if the MS has been assigned time-frequency resource units numbered 56-59 in frame N 520, then the persistent assignment must expire in frame N+1 540 since there are only a total of 44 time-frequency resource units.

The boundary used to number time-frequency resource units may be the boundary between the DL region and the UL region, a boundary between two zones in the DL region or the UL region, or so forth. For example, in the IEEE 802.16e standard, the BS may define permutation zones in the time domain. A boundary between two permutation zones may be used as a boundary used to number time-frequency resource units and may be used for a dynamic persistent allocation.

Figure 6:
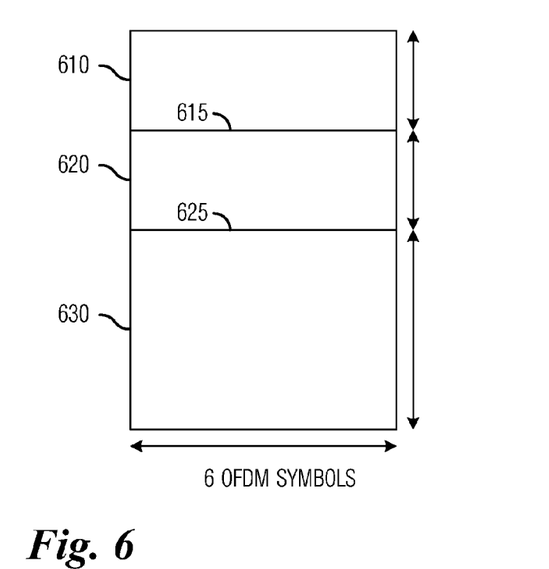
FIG. 6 is a diagram of boundaries in a frequency domain.

FIG. 6 is a diagram illustrating boundaries in the frequency domain. As shown in FIG. 6, a BS may divide the frequency domain into three regions 610, 620, and 630 by transmitting at least two boundary indications (such as boundary indications 615 and 625) to a MS. In an embodiment, each region may correspond to a different resource size. For example, region 610 may have resource blocks of size one (1), region 620 may have resource blocks of size two (2), and region 630 may have resource blocks of size four (4). If the MS is persistently assigned a resource block of size four (4) at resource block numbered six (6), then the MS shifts its assigned resource to maintain the use of the resource block numbered six (6) of the resource blocks of size four (4).

In another embodiment, the BS transmits a beginning resource block to the MS, along with information related to how the resource blocks are partitioned. The MS may then determine its relative position based on the information. For example, if the MS determines that it is the sixth MS in the frequency domain region corresponding to resource blocks of size four (4) based on an initial resource block assignment, the MS may determine that it has been assigned resource block numbered six (6). In this embodiment, the BS does not actually transmit the value six (6) to the MS, but rather, the value six (6) may be derived based on other indications. The position indication may correspond to other information in other embodiments.

Figure 7:
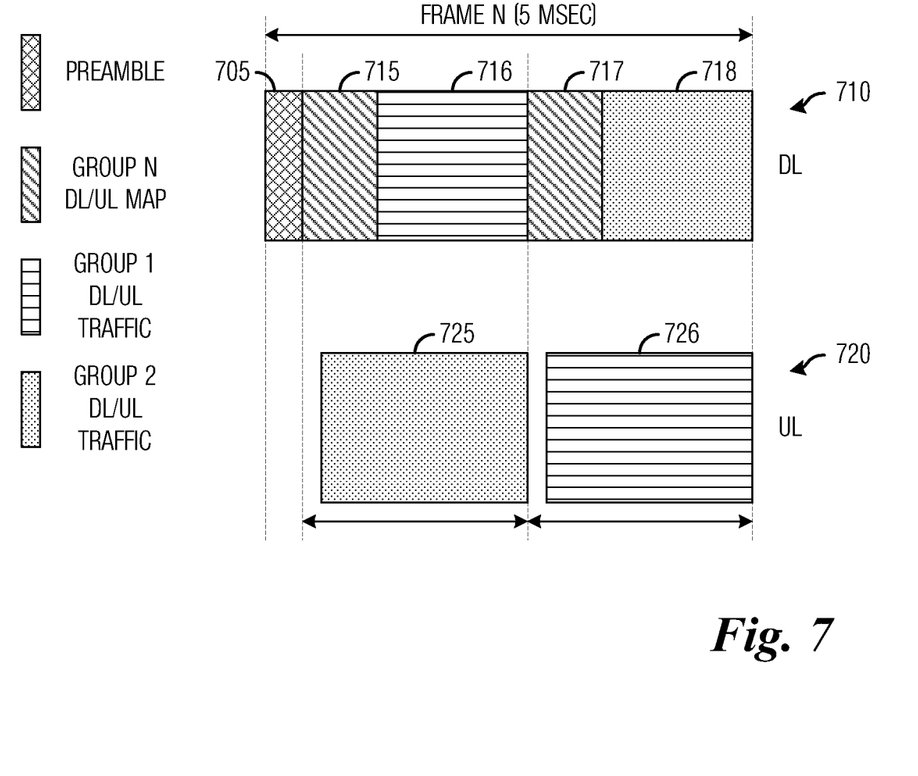
FIG. 7 is a diagram of a frame structure of a H-FDD wireless communications system.

FIG. 7 is a diagram illustrating a frame structure for an H-FDD wireless communications system. The H-FDD wireless communications system includes a BS and a plurality of MS divided into two groups, group one (1) and group two (2). In each frame, both groups of MS monitor a preamble 705. In a DL 710, the BS first transmits to group one (1) MS with a MAP (or a control message) 715 that may be applicable to MS in the group and then transmits traffic 716 to the group one (1) MS. Then, the BS transmits to group two (2) MS with a MAP (or a control message) 717, followed by traffic 718.

MAP (or control message) 715 contains a DL control channel and an UL control channel. The DL control channel may be transmitted every frame or as needed by the BS. For example, the DL control channel may be a DL-MAP as defined by the IEEE 802.16e standard. Alternatively, the DL control channel may be a DL channel descriptor (DCD as defined by the IEEE 802.16e standard). On an UL 720, the BS first receives traffic 725 from group two (2) MS followed by traffic 726 from group one (1) MS.

Figure 8:
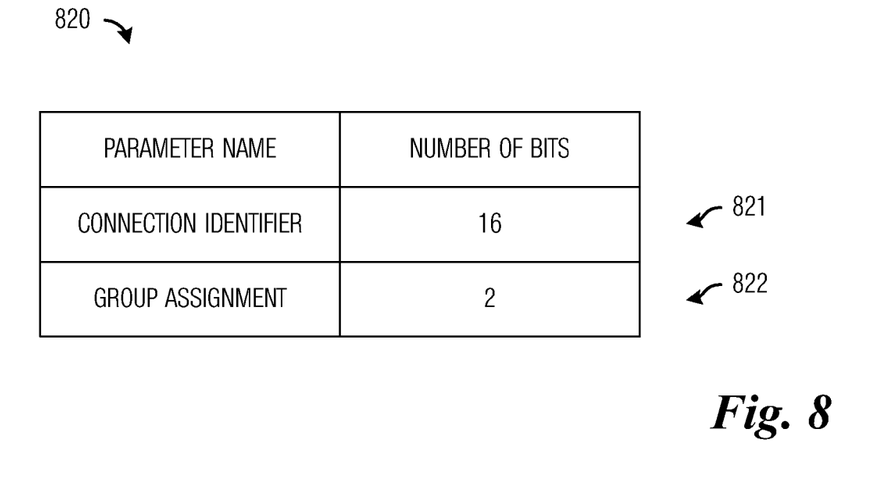
FIG. 8 is a diagram of a first control channel message in a H-FDD wireless communications system.

The BS may distribute the MS to available H-FDD groups. This process may be random, explicitly assigned, or implicitly assigned. FIG. 8 is a diagram illustrating an assignment message 820 that may be used with explicit assignment. Assignment message 820 may be referred to as a group assignment message. Assignment message 820 includes a connection identifier 821 of intended MS. Connection identifier 821 may be a 16 bit long field that uniquely identifies a MS. Assignment message 820 also includes a group assignment 822, a two-bit field that assigns the MS to a group. Once a MS is assigned to a group, it typically monitors only control channels corresponding to that group.

Figure 9:
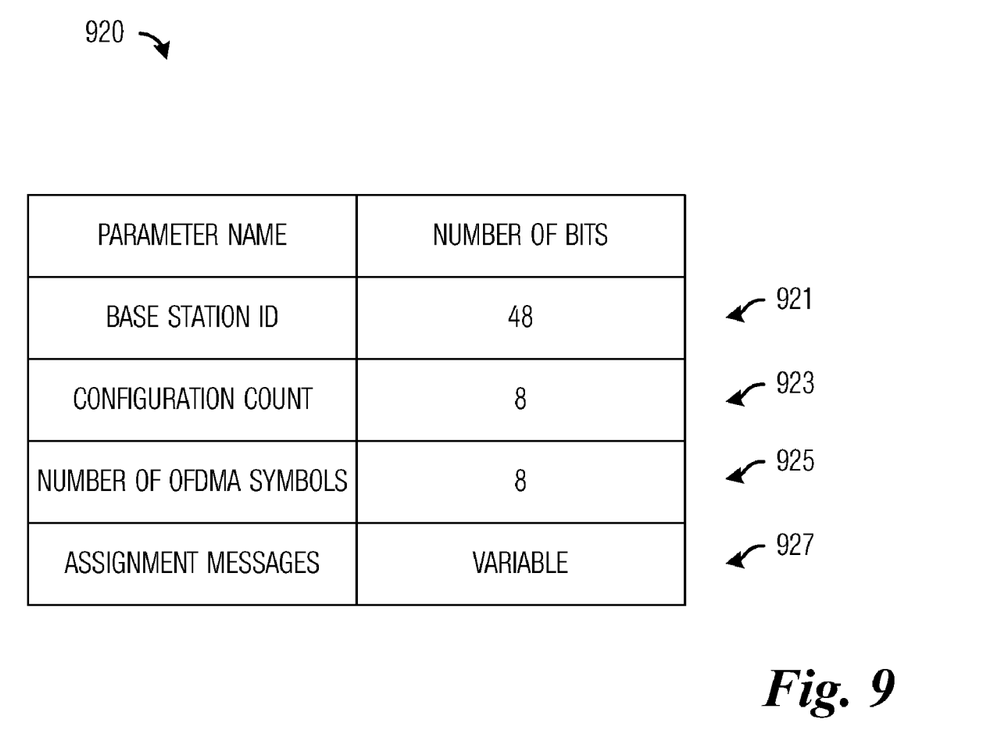
FIG. 9 is a diagram of a second control channel message in a H-FDD wireless communications system.

FIG. 9 is a diagram illustrating a control message 920. Control message 920 includes a 48-bit BS identifier (BASE STATION ID) 921, an 8-bit indication of current system configuration (CONFIGURATION COUNT) 923, an 8-bit indication of a number of OFDMA symbols in DL (NUMBER OF OFDMA SYMBOLS) 925, and a variable number of assignment messages (ASSIGNMENT MESSAGES) 927.

Control message 920 may also contain additional information, for example, control message 920 may be a DL-MAP message as defined by the IEEE 802.16e standard. Additionally, NUMBER OF OFDMA SYMBOLS 925 may be used in a TDD wireless communications system for indicating a boundary between DL and UL regions.

A boundary between H-FDD group 1 and H-FDD group 2 (shown as UL traffic 725 from group two (2) MS followed by traffic 726 from group one (1) MS in FIG. 7) may be another example of a boundary which has impact on persistent allocation. If the BS increases the DL for group one (1) MS, thereby decreasing the DL for group two (2) MS (and vice versa on the UL), then the MS may need to shift their persistent resource by the amount of change in the boundary.

Figure 10:
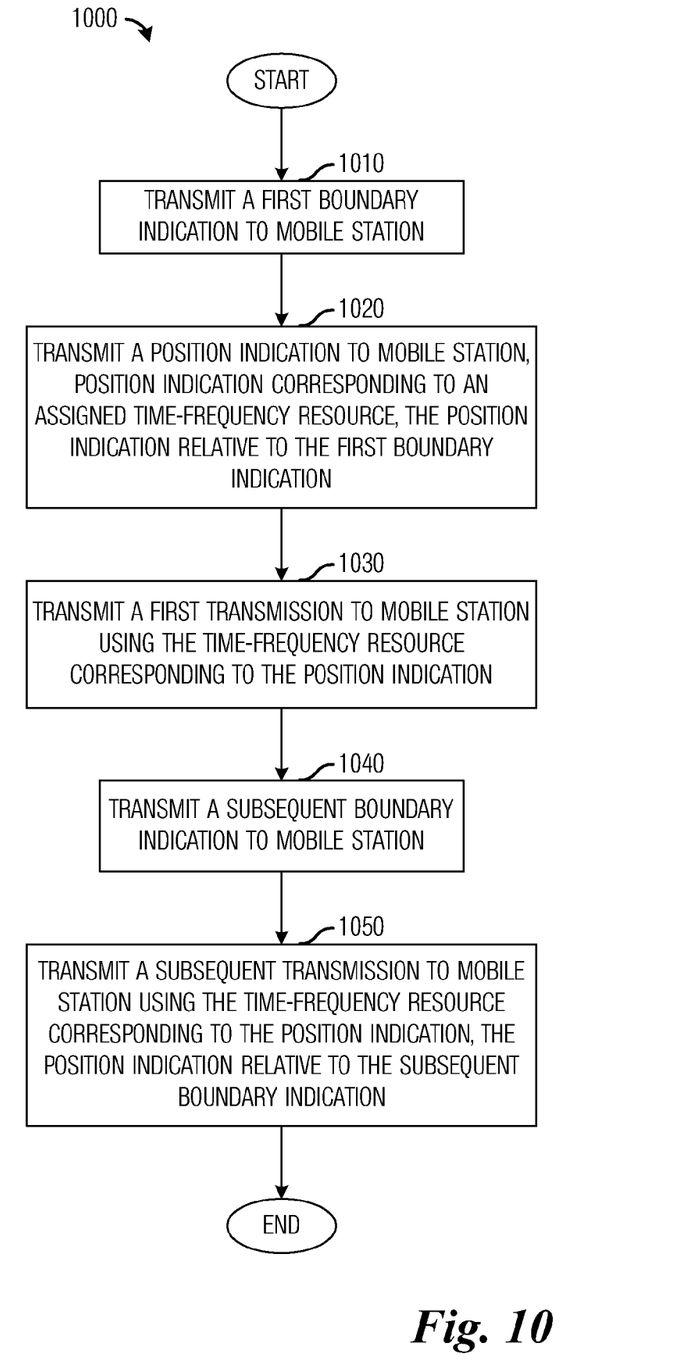
FIG. 10 is a flow diagram for base station operation.

FIG. 10 is a flow chart 1000 for BS operation. Flow chart 1000 may be descriptive of the operation of a BS in a wireless communications system when the BS has made a persistent resource allocation to a MS. The operation of the BS may occur periodically with a periodicity about equal to a frame rate of the wireless communications system. Alternatively, the operation of the BS may occur when the BS has made a change to a boundary used to reference a persistent resource allocation, when a persistent resource allocation expires or is revoked, or so on.

The operation of the BS may begin when the BS transmits a first boundary indication to the MS (block 1010). The boundary indication may be a boundary between DL and UL regions in a TDD wireless communications system, a boundary between group one (1) and group (2) MS in an H-FDD wireless communications system, between regions in the frequency domain, between permutation zones, and so forth. The BS may then transmit a position indication to the MS (block 1020). The position indication may correspond to an assigned time-frequency resource assigned to the MS. The position indication is relative to the first boundary indication. For example, the position indication may be a slot offset, a beginning resource block, an order in a list of MS, and the like.

The BS may then transmit a first transmission to the MS using the assigned time-frequency resource corresponding to the position indication (block 1030). The BS may also transmit a subsequent boundary indication to the MS (block 1040). The BS may transmit the subsequent boundary indication to the MS whenever the boundary used in the first boundary indication has changed, a persistent resource allocation has expired or been revoked, or so forth. Furthermore, the BS may transmit the subsequent boundary indication to the MS in the case that the BS changes a boundary used to reference the assigned time-frequency resources. The BS may then transmit a second transmission to the MS using the assigned time-frequency resource corresponding to the position indication but relative to the subsequent boundary indication, not the first boundary indication (block 1050). Additional subsequent boundary indications may be transmitted to the MS by the BS as long and the persistent resource allocation remains active and boundary positions change.

As shown in FIG. 10, the operation of the BS is for DL operation. For UL operation, the BS receives a first transmission (block 1030) and a second transmission (block 1050) from the MS instead of transmitting the first transmission and the second transmission as discussed above.

Figure 11:
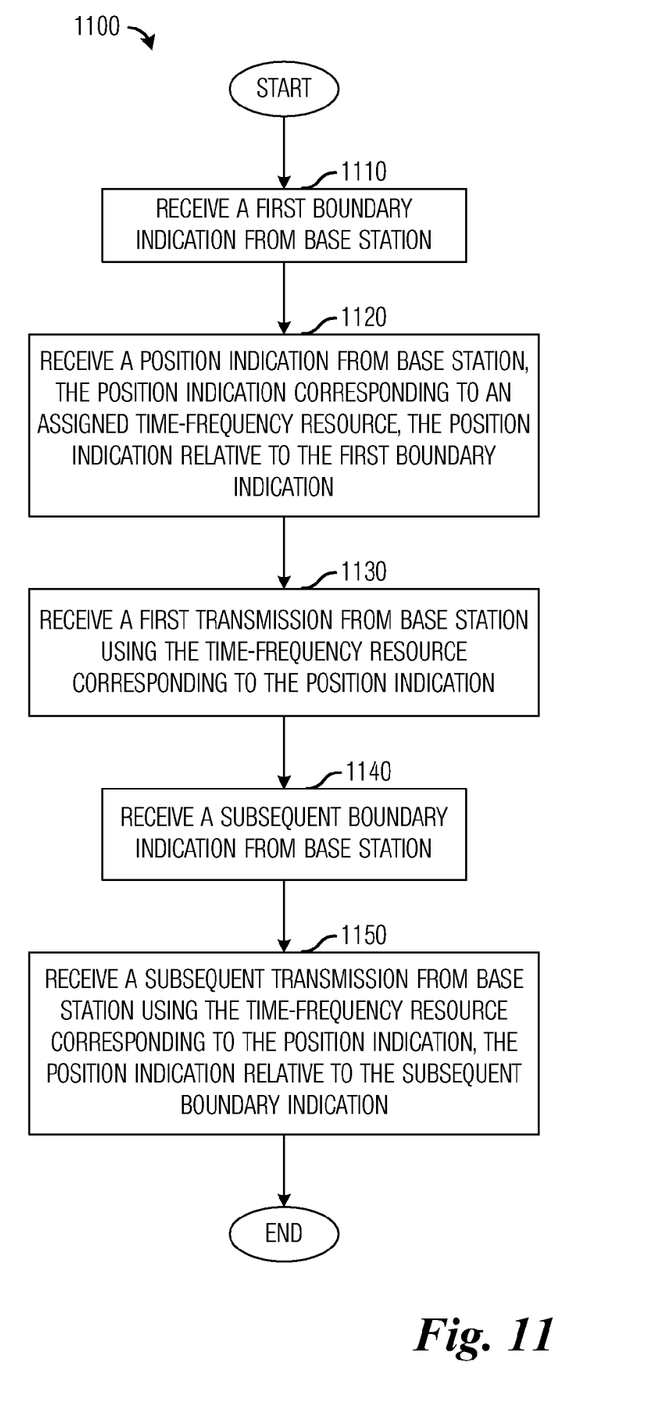
FIG. 11 is a flow diagram for mobile station operation.

FIG. 11 is a flow chart 1100 for MS operation. Flow chart 1100 may be descriptive of the operation of a MS in a wireless communications system when the MS has made a request for a persistent resource allocation from a BS. The operation of the MS may occur periodically with a periodicity about equal to a frame rate of the wireless communications system. Alternatively, the operation of the MS may occur when the MS has made a request for a persistent resource allocation.

The operation of the MS may begin when the MS receives a first boundary indication from the BS (block 1110). The first boundary indication may provide the MS information such as a position of a time-frequency resource that the MS will reference when determining an assigned time-frequency resource. The MS may then receive a position indication from the BS (block 1120). The position indication may correspond to the assigned time-frequency resource with the position indication being relative to the first boundary indication. The MS may then receive a first transmission from the BS using the assigned time-frequency resource corresponding to the position indication (block 1130). This is descriptive of DL operation. For UL operation, the MS may transmit a first transmission to the BS using the assigned time-frequency resource corresponding to the position indication.

The MS may then receive a subsequent boundary indication from the BS (block 1140). As discussed previously, the BS may transmit the subsequent boundary indication whenever the boundary used in the first boundary indication has changed, a persistent resource allocation has expired or been revoked, or so forth. The MS may also receive a second transmission from the BS (block 1150). The second transmission may be made using the assigned time-frequency resource corresponding to the position indication, but the position indication is relative to the subsequent boundary indication and not the first boundary indication. Again, this is descriptive of DL operation. For UL operation, the MS may transmit a second transmission to the BS using the assigned time-frequency resource corresponding to the position indication relative to the subsequent boundary indication and not the first boundary indication. Additional subsequent boundary indications may be received at the MS from the BS as long as the persistent resource allocation remains active and boundary positions change.

A persistent resource allocation may be used to transmit all or part of data to be transmitted. As an example, it may be possible to establish a persistent resource allocation to permit a MS to transmit or receive information. If errors are detected in any of the transmissions, it may be possible to use the persistent resource allocation to retransmit the transmission(s) or an entirely separate resource allocation may be established to retransmit the transmission(s) alone. Since errors are rare and it may be possible to correct a percentage of errors, the requirement of establishing a separate resource allocation may have a significant impact on the performance of the transmissions made by the MS.

Figure 12A:
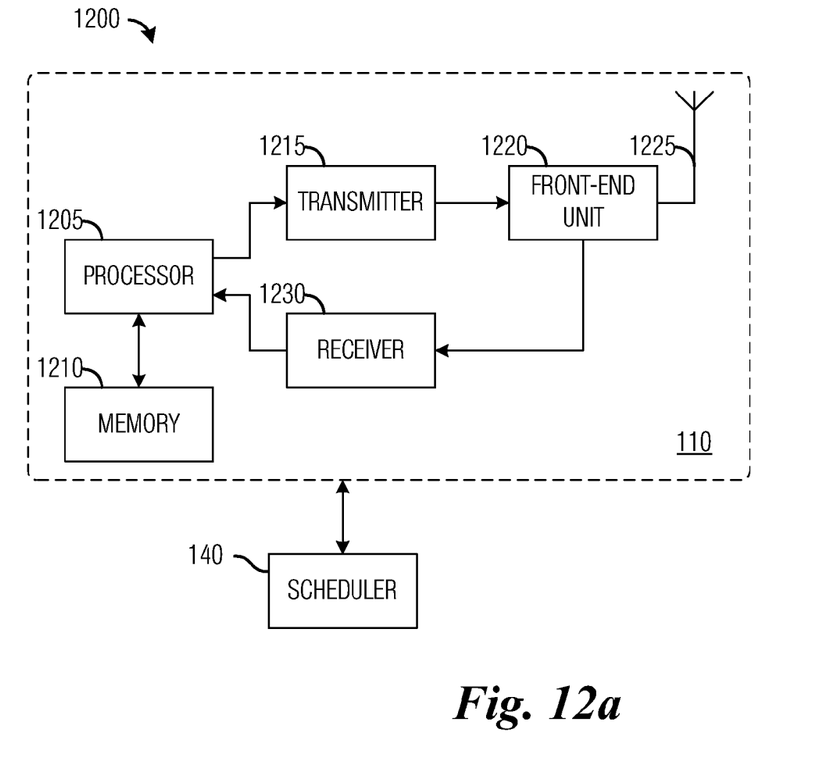
FIG. 12a is a diagram of a communications device.

FIG. 12*a* illustrates a detailed view of a communications device 1200 for use in controlling the operation of a wireless communications system, such as an H-FDD or TDD wireless communications system. The communications device 1200 may include a BS 110 and a scheduler 140. BS 110 may be used to coordinate communications for a number of MS operating in the wireless communications network, as well, as allowing communications between multiple MS and between an MS and BS 110. Furthermore, BS 110 may select a boundary for use as a position indication to be used as a reference point for determining time-frequency resources for persistent resource allocations. BS 110 also transmits a boundary indication based on the boundary to mobile stations communicating with BS 110 and if BS 110 changes the boundary's position, BS 110 transmits an updated boundary indication to the mobile stations, which will replace the boundary indication with the updated boundary indication.

Scheduler 140 may be used in the assigning of radio resources, enabling a sharing of a common communications medium. For example, BS 110 may provide a time-frequency resource request to scheduler 140 and scheduler 140 may return an offset relative to the boundary selected by BS 110 (the position indication, for example). Scheduler 140 may also return a number of time-frequency resources that adequately satisfies the time-frequency resource request, with the number of time-frequency resources starting at the position indication. Alternatively, scheduler 140 returns a starting time-frequency resource number and an ending time-frequency resource number, or a flag indicating that the time-frequency resource request may not be satisfied.

BS 110 may include a processor 1205 that may be used to process signals to be transmitted and/or signals received. Processor 1205 may also be used to execute applications, etc. For example, processor 1205 may execute applications that may be needed to coordinate transmissions by MS in communications with BS 110. This may help maximize radio resource sharing while minimizing transmission collisions, errors, and so on. Depending on embodiment, processor 1205 may be implemented as several different processors, such as a digital baseband processor and/or a general purpose processor. Processor 1205 may store data, information, applications, and so forth, in a memory 1210. Processor 1205 may provide data to be transmitted to a transmitter 1215 that may process the data for transmission, which may include encoding, spreading, mixing, filtering, interleaving, and so forth. The data processed for transmission may then be provided to a front-end unit 1220, which may include filters, duplexers, transmit/receive switches, signal amplifiers, and so forth. An antenna (or antennas) 1225 may then transmit the data over-the-air.

In addition to transmitting the data, antenna 1225 may also receive data. Depending on embodiment, separate antennas may be used for transmission and reception, or antenna 1225 may be shared. Received data detected by antenna 1225 may be provided to front-end unit 1220 where it may be filtered, amplified, and so on. A receiver 1230 may then be provided the received signal, wherein receiver 1230 may process the received signal to produce data usable by processor 1205. Receiver 1230 may be used to perform operations such as error detection and correction, filtering, despreading, down-conversion, and so forth.

Figure 12B:
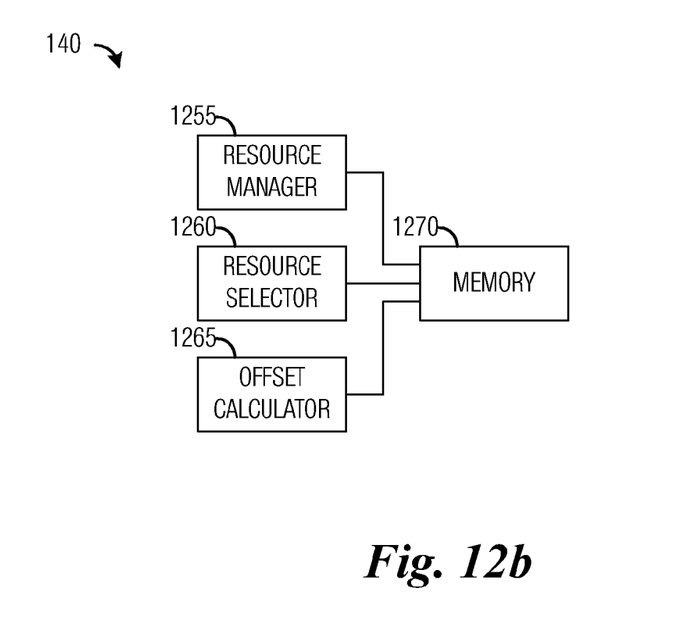
FIG. 12b is a diagram of a scheduler.

FIG. 12*b* illustrates a detailed view of scheduler 140. As discussed previously, scheduler 140 may be used to assign radio resources, such as, time-frequency resources, to MS requesting resources for transmitting and/or receiving information. Scheduler 140 may include a resource manager 1255. Resource manager 1255 may be used to maintain information on available radio resources, such as, time-frequency resources. Resource manager 1255 may keep track of which time-frequency resources have been assigned for use, how long have they been assigned, when they will become free, and so forth. Furthermore, when the BS decides to service a time-frequency resource request, resource manager 1255 may be used to find unassigned time-frequency resources that fulfill the time-frequency resource request.

Scheduler 140 may also include a resource selector unit 1260. Resource selector unit 1260 may select one or more time-frequency resources to fulfill the time-frequency resource request. Resource selector unit 1260 may select the time-frequency resources based on information provided by resource manager 1255. Resource selector unit 1260 may use techniques to help attain performance goals, such as reduce fragmentation of the time-frequency resources, maximize time-frequency resource utilization, utilization of available bandwidth, maximize a number of MS time-frequency resource requests, minimize time-frequency resource request wait time, and so forth. Attaining some of the above listed goals may make it not possible to attain some of the other listed goals. Resource selector unit 1260 may have the capability of selecting which goals to maximize.

Scheduler 140 may also include an offset calculator unit 1265. Offset calculator unit 1265 may be used to compute a relative offset between a time-frequency resource selected by resource selector unit 1260 to fulfill a time-frequency resource request and a boundary indication specified by BS 110. If BS 110 updates the boundary indication, for example, when BS 110 changes or moves the boundary, offset calculator unit 1265 will use the updated boundary indication in place of the boundary indication in its calculations. Offset calculator unit 1265 may provide the relative offset to BS 110 for transmission to the mobile station. Resource manager 1255, resource selector 1260, and offset calculator unit 1265 may be coupled to a memory 1270. Memory 1270 may be used to store time-frequency resource allocations, time-frequency resource allocation expiration times, resource holes, resource hole numbering, and so forth.

Figure 13:
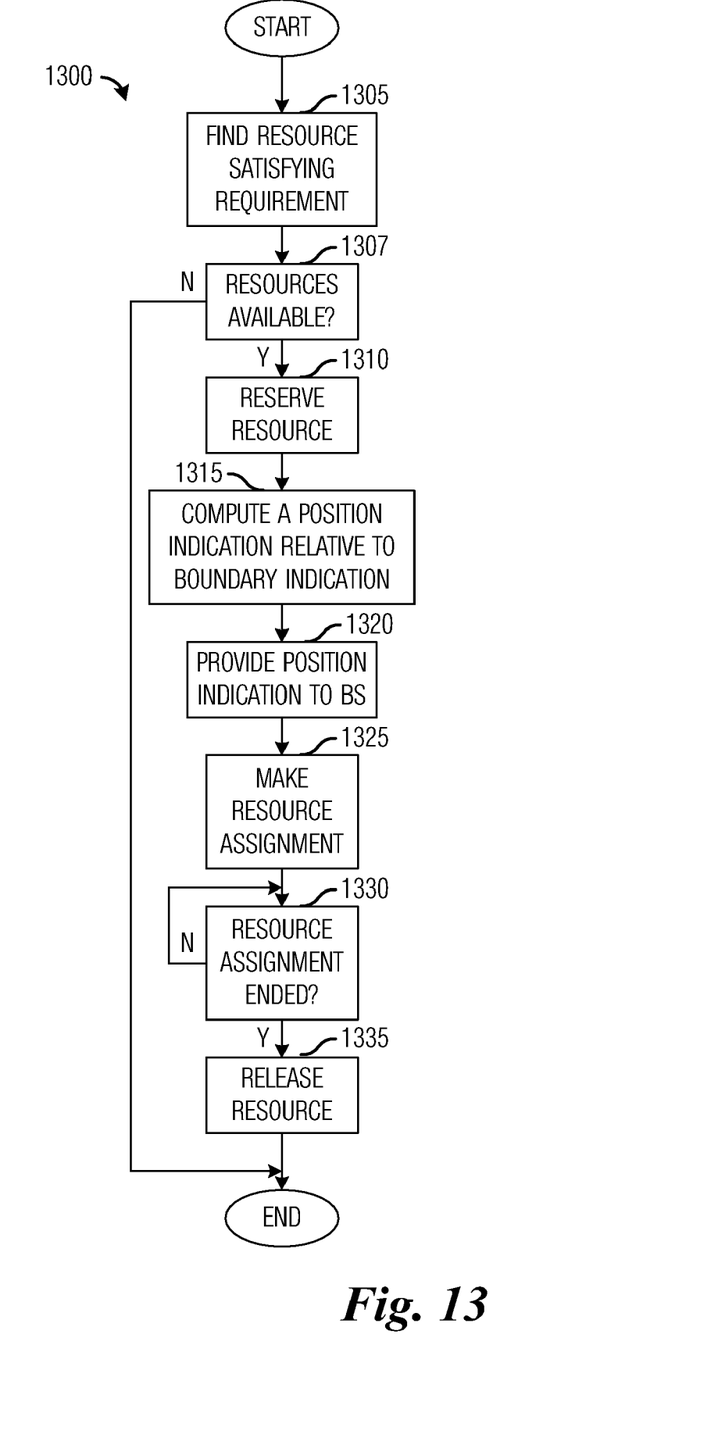
FIG. 13 is a flow diagram for scheduler operation.

FIG. 13 is a flow diagram 1300 for scheduler operation. Flow chart 1300 may be descriptive of the operation of a scheduler, such as scheduler 140, when scheduler 140 receives a persistent resource allocation request from a BS, such as BS 110. Scheduler 140 may also become active when BS 110 makes a change to a boundary used to reference position indications.

The operation of scheduler 140 may begin when scheduler 140 is provided a persistent time-frequency resource request by BS 110 (block 1305). The persistent time-frequency resource request may have originated from BS 110 or from a MS that desires the persistent time-frequency resource. Scheduler 140 may then search available time-frequency resources to determine if there are adequate time-frequency resources to satisfy the persistent time-frequency resource request (block 1307). If there are not enough time-frequency resources to satisfy the persistent time-frequency resource request, then the operation of scheduler 140 may terminate with a failure to satisfy the request.

If there are enough time-frequency resources to satisfy the persistent time-frequency resource request (block 1307), then scheduler 140 may select and reserve the time-frequency resource for the persistent time-frequency resource request (block 1310). After selecting and reserving the time-frequency resource, scheduler 140 may compute a position indication for the selected time-frequency resource relative to a boundary indication (block 1315). The position indication may be relative to the boundary selected by BS 110 (and provided to scheduler 140 as the boundary indication) as a reference for position indications. If BS 110 updates or otherwise moves or changes the boundary, BS 110 may provide an updated boundary indication to scheduler 140, and scheduler 140 will make use of the update boundary indication in its subsequent computations. The computed position indication may be provided to BS 110 (block 1320), where BS 110 may transmit the computed position indication to the MS, thereby completing the time-frequency resource assignment (block 1325).

If, while the persistent time-frequency resource allocation remains active BS 110 changes the boundary, BS 110 may provide a new boundary to scheduler 140. However, since the persistent time-frequency resource allocation is defined relative to the boundary, changes in the boundary may not impact the persistent time-frequency resource allocation and the position indication may remain unchanged.

However, it may be necessary to change the time-frequency resource assignment if the persistent time-frequency resource assignment has expired (or an event has occurred that may require the revoking of the persistent time-frequency resource assignment) (block 1330). If the persistent time-frequency resource assignment has expired, then the time-frequency resources associated with the persistent time-frequency resource assignment may be released for use in satisfying other time-frequency resource requests (block 1335). The operation of scheduler 140 may then terminate. If the persistent time-frequency resource assignment has not expired (block 1330), then scheduler 140 may return to block 1330 to check for expired persistent time-frequency resource assignments.

Although the embodiments and their advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for base station operation in a wireless communications system, the wireless communications system having a mobile station, the method comprising:
    transmitting a first boundary indication to the mobile station, wherein the first boundary indication is based on a position of a boundary;
    transmitting a position indication to the mobile station, the position indication corresponding to an assigned network resource assigned based on a network resource request, the position indication being relative with respect to the first boundary indication;
    transmitting a second boundary indication to the mobile station in response to detecting a change in the position of the boundary, wherein the second boundary indication is based on a changed position of the boundary; and
    transmitting a first transmission to the mobile station using a network resource corresponding to the position indication or receiving a second transmission from the mobile station using a network resource corresponding to the position indication, wherein the position indication is relative to the second boundary indication,
    wherein the boundary comprises a boundary between a downlink region and an uplink region of a frame, a boundary between two consecutive permutation zones in a downlink region or an uplink region of a frame, a boundary between two resource blocks both of which allocate network resources over a common period in the time-domain, or a boundary between mobile station traffic of different half-duplex frequency division duplex (H-FDD) groups.

2. The method of claim 1, further comprising after the transmitting a position indication to the mobile station, transmitting a third transmission to the mobile station using a network resource corresponding to the position indication.

3. The method of claim 2, wherein the network resource used to transmit the third transmission is located at a position indicated by a combination of the first boundary indication and the position indication.

4. The method of claim 1, further comprising after the transmitting a position indication to the mobile station, receiving a fourth transmission from the mobile station using a network resource corresponding to the position indication.

5. The method of claim 1, wherein the first boundary indication is based on a boundary specified by the base station.

6. The method of claim 1, wherein the transmitting a second boundary indication further comprises transmitting the second boundary indication in response to determining an expiration of an existing network resource assignment.

7. The method of claim 1, further comprising repeating the transmitting a second boundary indication for each detected change in the position of the boundary.

8. The method of claim 1, wherein the transmitting a second boundary indication further comprises transmitting the secondary boundary indication in response to determining a change from the boundary to a second boundary.

9. The method of claim 1, wherein the boundary comprises a boundary between a downlink region and an uplink region of a frame.

10. The method of claim 1, wherein the boundary comprises a boundary between two consecutive permutation zones in a downlink region or an uplink region of a frame.

11. The method of claim 1, wherein the boundary comprises a boundary between mobile station traffic of different H-FDD groups.

12. The method of claim 1, wherein the boundary comprises a boundary between two resource blocks both of which allocate network resources over a common period in the time-domain,
wherein the two resource blocks allocate a different number of resource elements over the common period in the time-domain, the resource elements comprising a sub-carrier of an orthogonal frequency division multiplex (OFDM) symbol, and the common period in the time window comprising one or more timeslots.

13. A method for mobile station operation in a wireless communications system, the wireless communications system having a base station, the method comprising:
receiving a first boundary indication from the base station, wherein the first boundary indication is based on a position of a boundary;
receiving a position indication from the base station, the position indication corresponding to an assigned network resource assigned based on a network resource request, the position indication being relative with respect to the first boundary indication;
receiving a second boundary indication from the base station, wherein the base station transmitted the second boundary indication in response to detecting a change in the position of the boundary; and
transmitting a first transmission to the base station using a network resource corresponding to the position indication or receiving a second transmission from the base station using a network resource corresponding to the position indication, wherein the position indication is relative to the second boundary indication,
wherein the boundary comprises a boundary between a downlink region and an uplink region of a frame, a boundary between two consecutive permutation zones in a downlink region or an uplink region of a frame, a boundary between two resource blocks both of which allocate network resources over a common period in the time-domain, or a boundary between mobile station traffic of different half-duplex frequency division duplex (H-FDD) groups.

14. The method of claim 13, further comprising after the receiving a position indication from the base station, transmitting a third transmission to the base station using a network resource corresponding to the position indication.

15. The method of claim 13, further comprising after the receiving a position indication from the base station, receiving a fourth transmission from the base station using a network resource corresponding to the position indication.

16. The method of claim 13, wherein the position indication comprises a count of network resources away from the first boundary indication or the second boundary indication.

17. The method of claim 13, wherein the position indication comprises a number indicating a position of the mobile station in a list of mobile stations having been assigned network resources.

18. The method of claim 17, wherein the list of mobile stations comprises mobile stations having been assigned network resources of a specified size.

19. A method for making persistent resource assignments, the method comprising:
finding a network resource satisfying a network resource assignment request;
reserving the network resource;
computing a position indication for the network resource relative to a boundary indication, wherein the boundary indication is based on a position of a boundary, and wherein the boundary indication changes corresponding to any changes in the position of the boundary;
providing the position indication to a base station; and
completing a network resource assignment,
wherein the boundary comprises a boundary between a downlink region and an uplink region of a frame, a boundary between two consecutive permutation zones in a downlink region or an uplink region of a frame, a boundary between two resource blocks both of which allocate network resources over a common period in the time-domain, or a boundary between mobile station traffic of different half-duplex frequency division duplex (H-FDD) groups.

20. The method of claim 19, further comprising releasing the network resource in response to determining an expiration of the network resource assignment.

21. The method of claim 19, wherein the computing a position indication comprises computing a difference between a value associated with the network resource and the boundary.

22. The method of claim 19, wherein the computing a position indication comprises computing a position of a mobile station assigned the network resource in a list of mobile stations assigned network resources of the same size.

23. An electronic device comprising:
a base station configured to coordinate communications of a mobile station associated with the base station, to select a boundary for use as a reference for indicating persistent network resource allocations, to transmit a first boundary indication based on a position of the boundary to the mobile station, and to transmit a second boundary indication to the mobile station when the position of the boundary changes, wherein the second boundary indication supersedes the first boundary indication; and
a scheduler coupled to the base station, the scheduler having a processor configured to determine allocatable network resources based on a resource request and to compute a relative offset for allocated network resources based on the boundary,
wherein the boundary comprises a boundary between a downlink region and an uplink region of a frame, a boundary between two consecutive permutation zones in a downlink region or an uplink region of a frame, a boundary between network resources of different size, or a boundary between mobile station traffic of different half-duplex frequency division duplex (H-FDD) groups,
wherein the processor is configured to execute a resource manager for maintaining assignments of network resources and to find a list of unallocated network resources capable of fulfilling a network resource request;
wherein the processor is configured to execute a resource selector for selecting assignment network resources from the list of unallocated network resources capable of fulfilling the network resource request; and
wherein the processor is configured to execute an offset calculator for computing a relative offset for allocated network resources, wherein the relative offset is referenced to the first boundary indication or the second boundary indication.

* * * * *